United States Patent
Schulz

(10) Patent No.: US 10,956,018 B2
(45) Date of Patent: *Mar. 23, 2021

(54) USER INTERFACE INDICATING OPERATION PROGRESS IN A SCROLLBAR

(71) Applicant: Snowflake Inc., San Mateo, CA (US)

(72) Inventor: Egan Schulz, San Jose, CA (US)

(73) Assignee: Snowflake Inc., San Mateo, CA (US)

( * ) Notice: Subject to any disclaimer, the term of this patent is extended or adjusted under 35 U.S.C. 154(b) by 707 days.

This patent is subject to a terminal disclaimer.

(21) Appl. No.: 15/479,152

(22) Filed: Apr. 4, 2017

(65) Prior Publication Data

US 2017/0206000 A1    Jul. 20, 2017

Related U.S. Application Data

(63) Continuation of application No. 14/451,810, filed on Aug. 5, 2014, now Pat. No. 9,612,735.

(51) Int. Cl.
*G06F 3/0485* (2013.01)
*G06F 9/451* (2018.01)
(Continued)

(52) U.S. Cl.
CPC ........ *G06F 3/04855* (2013.01); *G06F 3/0482* (2013.01); *G06F 3/04817* (2013.01); *G06F 9/451* (2018.02)

(58) Field of Classification Search
CPC ............... G06F 3/04855; G06F 3/0485; G06F 3/04847; G06F 3/0484; G06F 3/0482;
(Continued)

(56) References Cited

U.S. PATENT DOCUMENTS 5,339,391 A * 8/1994 Wroblewski ........ G06F 3/04855
345/607
6,486,896 B1 * 11/2002 Ubillos ............... G06F 3/04855
715/784
(Continued)

OTHER PUBLICATIONS

"Some things users love about Sublime Text", Sublime Text; The text editor you'll fall in love with, 2 pages [online], [retrieved on Jul. 31, 2014]. Retrieved from the Internet: <URL:http//www.sublimetext.com/.

(Continued)

*Primary Examiner* — Kieu D Vu
*Assistant Examiner* — Rami R Okasha
(74) *Attorney, Agent, or Firm* — Schwegman Lundberg & Woessner, P.A.

(57) ABSTRACT

Methods and systems for providing status and progress information on a scrollbar are described. A user opens a software application to perform operations or view items. The application includes a scrollbar in its graphical user interface. The user may perform a plurality of operations. The application determines a position on the scrollbar corresponding to a location of the operation or item. The application determines a status representation corresponding to a status of the operation or item. The application determines a height of a scrollbar segment corresponding to a length of the operation or item. The application displays the status representation in the scrollbar segment at the position. The application may also display changes in the status representation to provide progress information.

19 Claims, 8 Drawing Sheets

(51) Int. Cl.
*G06F 3/0482* (2013.01)
*G06F 3/0481* (2013.01)

(58) Field of Classification Search
CPC ............ G06F 3/04817; G06F 3/04895; G06F 3/04897; G06F 9/451
See application file for complete search history.

(56) References Cited

U.S. PATENT DOCUMENTS

| | | | |
|---|---|---|---|
| 9,612,735 B2 | 4/2017 | Schulz | |
| 9,652,136 B2* | 5/2017 | Tarvainen | H04N 5/23216 |
| 9,715,482 B1* | 7/2017 | Bjorkegren | G06F 17/24 |
| 2002/0063737 A1* | 5/2002 | Feig | G06F 3/04847 |
| | | | 715/786 |
| 2002/0186252 A1* | 12/2002 | Himmel | G06F 3/04855 |
| | | | 715/787 |
| 2003/0174173 A1* | 9/2003 | Nishiyama | G06F 3/04855 |
| | | | 715/786 |
| 2005/0097135 A1* | 5/2005 | Epperson | H04N 21/42224 |
| 2005/0138565 A1* | 6/2005 | Jaeger | G06F 3/04847 |
| | | | 715/747 |
| 2005/0222965 A1* | 10/2005 | Chaudhuri | G06F 16/217 |
| 2006/0184901 A1* | 8/2006 | Dietz | G06F 16/34 |
| | | | 715/855 |
| 2007/0143705 A1* | 6/2007 | Peters | G06F 3/04855 |
| | | | 715/786 |
| 2007/0157112 A1 | 7/2007 | Peters | |
| 2007/0192729 A1* | 8/2007 | Downs | G06F 3/04855 |
| | | | 715/786 |
| 2008/0104535 A1 | 5/2008 | DeLine et al. | |
| 2008/0134033 A1* | 6/2008 | Burns | G06F 16/338 |
| | | | 715/705 |
| 2008/0158261 A1* | 7/2008 | Gould | G06F 3/04855 |
| | | | 345/666 |
| 2008/0178116 A1* | 7/2008 | Kim | G06F 3/04847 |
| | | | 715/786 |
| 2008/0256474 A1* | 10/2008 | Chakra | G06F 3/0481 |
| | | | 715/772 |
| 2008/0307348 A1* | 12/2008 | Jones | G06F 3/04847 |
| | | | 715/772 |
| 2010/0095239 A1* | 4/2010 | McCommons | G06F 3/04855 |
| | | | 715/784 |
| 2011/0246943 A1* | 10/2011 | Fujibayashi | G06F 3/0488 |
| | | | 715/833 |
| 2012/0030614 A1 | 2/2012 | Tuli | |
| 2012/0144330 A1* | 6/2012 | Flint | G06F 3/04847 |
| | | | 715/765 |
| 2012/0167003 A1* | 6/2012 | Johansson | G06F 3/04855 |
| | | | 715/786 |
| 2012/0198326 A1 | 8/2012 | Bhaskar | |
| 2013/0132892 A1* | 5/2013 | Lentz | G06F 3/0488 |
| | | | 715/786 |
| 2014/0033099 A1 | 1/2014 | Treitman et al. | |
| 2014/0215386 A1* | 7/2014 | Song | G06F 3/04855 |
| | | | 715/787 |
| 2014/0365886 A1* | 12/2014 | Koenig | G06F 3/04855 |
| | | | 715/711 |
| 2015/0058780 A1* | 2/2015 | Malik | H04N 21/2223 |
| | | | 715/772 |
| 2016/0041736 A1 | 2/2016 | Schulz | |

OTHER PUBLICATIONS

"U.S. Appl. No. 14/451,810, Examiner Interview Summary dated Aug. 2, 2016", 3 pgs.
"U.S. Appl. No. 14/451,810, Non Final Office Action dated May 11, 2016", 19 pgs.
"U.S. Appl. No. 14/451,810, Notice of Allowance dated Nov. 21, 2016", 13 pgs.
"U.S. Appl. No. 14/451,810, Response filed Aug. 11, 2016 to Non Final Office Action dated May 11, 2016", 11 pgs.
"U.S. Appl. No. 15/479,152, Examiner Interview Summary dated Mar. 2, 2020", (4 pgs).

* cited by examiner

STATUS REPRESENTATIONS
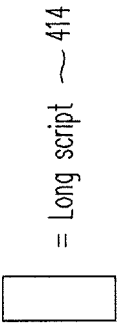 = Cued but not started ~ 402
 = In progress ~ 404
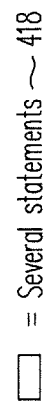 = Complete ~ 406
 = Lots of errors ~ 408
= Completed with few errors ~ 410
FIG. 4A
HEIGHTS OF SEGMENTS
 = Long script ~ 414
 = One statement ~ 416
 = Several statements ~ 418
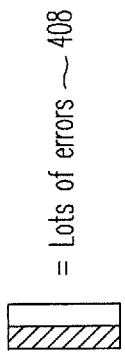 = Lots of statements ~ 420
FIG. 4B

```
-- use sales database
use database sales;

-- load sales data for the day
copy into nation from @sales_stage/nation/
file_format=csv;
copy into region from @sales_stage/region/
file_format=csv;
copy into supplier from @sales_stage/supplier/
file_format=csv;
copy into product from @sales_stage/part/
file_format=csv;
copy into customer from @sales_stage/customer/
file_format=csv;
copy into productsupp from @sales_stage/partsupp/
file_format=csv;
copy into orders from @sales_stage/orders/
file_format=csv;
copy into lineitem from @sales_stage/lineitem/
file_format=csv;

-- load application log data
use database applog;

-- load log data for the day
copy into applog from @applog_stage/
file_format=json;

-- use sales database
use database sales;

--
-- Run all canned reports
--

-- Q01: Pricing Summary Report Query (Q1)
-- This query reports the amount of business that
was billed, shipped, and returned.
select
    l_returnflag,
    l_linestatus,
    sum(l_quantity) as sum_qty,
    sum(l_extendedprice) as sum_base_price,
    sum(l_extendedprice * (1 - l_discount)) as sum_disc_price,
    sum(l_extendedprice * (1 - l_discount)*
```

FIG. 6

USER INTERFACE INDICATING OPERATION PROGRESS IN A SCROLLBAR

CROSS REFERENCE TO RELATED APPLICATION

This application is a continuation application of U.S. patent application Ser. No. 14/451,810, filed Aug. 5, 2014, now U.S. Pat. No. 9,612,735, which is incorporated herein by reference in its entirety.

BACKGROUND

Field of the Invention

The present invention relates to displaying data and, in particular, to a scrollbar providing status, progress, and length information in a graphical user interface (GUI).

Related Art

Many software applications present a scrollbar in a GUI. A scrollbar provides proportional position of displayed content and allows a user to scroll continuous content (e.g., text, pictures, etc.) when the full content does not fit a window or display. Typically, scrollbars are displayed on one or two sides of a window or display as a long, narrow rectangular area that contains a track, a bar, and arrow buttons at each end of the track. The track runs along one side of the window or display. A user may move the displayed content across the window or display, i.e. "scroll," by dragging the bar along the track, by clicking on the arrow button, or clicking on an empty area on the track. Scrollbars that allow a user to scroll vertically up and down in a window are typically placed on the right-hand side of the window, while scrollbars that allow a user to scroll horizontally left and right in a window are typically placed on the bottom of the window. In a conventional scrollbar, the track of the scrollbar represents the full length of a text, picture, or any other continuous content, and does not provide additional information.

There are many instances where a user may want more information regarding content that is not currently displayed in a window or display. For example, in many applications or programs, there may be too many processes, operations, or items to be viewed conveniently on a window or display. The user may want to quickly view the status or progress of all processes, operations, or items, but making the content smaller to view all the processes, operations, or items in a window or display may make the text or image too small to be legible or useful. There exist applications with a minimap feature that displays a miniature representation of actual content and also provides the functions of a conventional scrollbar. However, the miniature representation on the minimap may be too small to be legible or useful, and does not provide status or progress information. Thus, the user may have to scroll to see the status and progress of the processes, operations, or items. This is inconvenient if the user wants to see the status or progress of all processes, operations, or items in one convenient location, and to jump to processes, operations, or items with a certain status.

Thus, a need exists for systems and methods that allow a user to conveniently view status and/or progress information on a scrollbar of a GUI.

BRIEF DESCRIPTION OF THE FIGURES

FIG. 4A are examples of status representations that may be used to provide status and/or progress information on a scrollbar according to an embodiment of the present disclosure;

FIG. 4B are examples of heights of segments on a scrollbar that may be used to provide length information on a scrollbar according to an embodiment of the present disclosure;

FIG. 6 is a screenshot that illustrates a scrollbar providing status, progress, and/or length information of queries according to an embodiment of the present disclosure;

Figure 1:
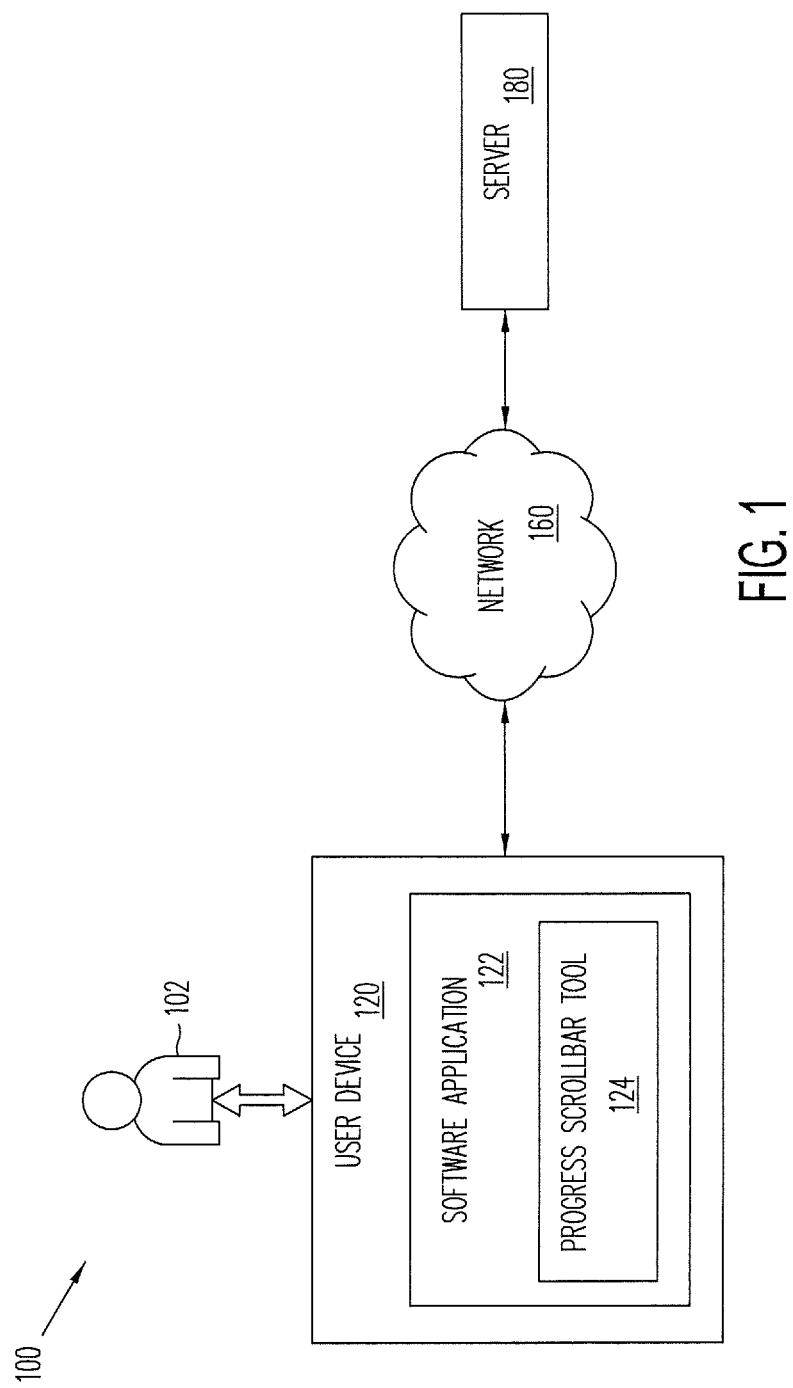
FIG. 1 is a block diagram illustrating a system for providing status, progress, and/or length information on a scrollbar according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods for providing status, progress, and/or length information on a scrollbar. As used herein, "status" represents the condition or state of an operation, such as, but not limited to, "completed," "in progress," "completed with errors," or "incomplete." As used herein, "progress" represents the advancement of an operation towards completion. For example, the scrollbar can show progression of an operation by movement of a colored section from left to right. As used herein, "length" represents how long an operation is within a continuous text, pictures, or any other continuous content.

In many embodiments, a scrollbar provides status information of operations such as SQL (Structured Query Language) queries. SQL queries retrieve or fetch data in a database based on specific search criteria. In various embodiments, the status information is graphically represented on the scrollbar by a status representation that is displayed on the scrollbar. The status representation of an operation, which corresponds to the status of that operation, may be displayed in a segment or box of the scrollbar.

Because the status representation for each operation (e.g., SQL query) depends on the status, a user can identify the status of an operation by looking at the status representation. For example, an operation may have the status of "complete," "in progress," "cued," or "errors." Each type of status may be associated with a status representation. Each status representation may include a distinctive icon, color, color scheme, shape, design, image, or any combination thereof. For example, the color blue as a status representation may indicate a status of "in progress," the color green as a status representation may indicate a status of "complete," the color red as a status representation may indicate a status of "several errors," and the color green as a status representation with a small red sliver in the middle may indicate a status of "completed with few errors."

In various embodiments, a scrollbar provides length information for operations. The length information is represented on the scrollbar by a segment of the scrollbar, i.e., a scrollbar segment. The segments may be displayed in any way that visually separates the different segments, such as segments with lines marking the ends of segments, segments with rectangular outlines, etc. The height of the segment is proportional to the length or duration of the corresponding operation. For example, for a scrollbar that provides length information for SQL queries, an SQL query with one statement is represented by a short segment, an SQL query with lots of statements is represented by a tall segment, and a query with several statements is represented by a segment of intermediate height.

In an exemplary embodiment, a scrollbar provides both status and length information of operations. The status and length information are graphically represented on the scrollbar by displaying a status representation in a segment on the scrollbar. The type of status representation to be displayed is determined by the status of each operation, and the segment height is determined by the length of each operation in proportion to the full content. The status representation of the operation is displayed in the scrollbar segment for that operation. In other words, the status representation displayed on the scrollbar varies in height depending on the length of the operation. In other embodiments, each operation is represented by segments or boxes of equal size, with each segment or box displaying the status representation corresponding to the status of the operation.

In additional embodiments, the scrollbar also provides progress information of the different operations. In one embodiment, the progress information is graphically represented on the scrollbar by displaying changes in the status representation, such as a moving progress bar or line across the status representation. In an embodiment, the progress information is provided by updating the status representation and/or the segment height corresponding to each operation. For example, the status representation and the segment height may be dynamically updated and/or refreshed in real-time. In another example, the status representation and/or segment height may be updated and/or refreshed periodically. In a further example, the status representation and/or segment height may be updated only when the user chooses to refresh/update, such as by clicking a refresh button.

In certain embodiments, a scrollbar has an adjustable width, and provides varying levels of information depending on its width. The width of the scrollbar can be adjusted, i.e., widened or narrowed, and the amount of information displayed can be varied depending on the width of the scrollbar. A first level of information displayed, in which the least amount of information is displayed, may be a conventional scrollbar with no additional information. A second level may be a scrollbar that provides (1) only status information by displaying status representations on the scrollbar, or (2) only length information by displaying segments on the scrollbar. A third level may be a scrollbar that provides both status and length information by displaying status representations in segments of the scrollbar with varying lengths. A fourth level may be a scrollbar providing a miniature representation of the full content (e.g., text, picture, spreadsheet, list, etc.). For adjustable scrollbars that provide different levels of information and/or change form depending on their width, different combinations of the above scrollbars may be used in various embodiments.

In a further embodiment, the user can choose to see the status representation of all operations. For example, an application may display all status representations when the user selects a "see all" button. In an embodiment, the user can choose to see the status representation of select operations by selecting one or more segments to display status representation. For example, the user may click on the segments of interest.

In some embodiments, a scrollbar provides status information of items such as files, messages, goods, products, services, etc. The items may be displayed in an application in various forms, such as a list, a spreadsheet, or a group of icons or images. The status information is graphically represented on the scrollbar by the status representation. The status representation of an item, which corresponds to the status of that item, is displayed in a box or segment of the scrollbar. Since the status representation of each item depends on the status of the represented item, the user can identify the status of an item by looking at the status representation. For example, the status of an item may be "read," "unread," or "urgent." Each type of status may be graphically represented by a distinctive icon, color, color scheme, shape, design, image, or any combination thereof.

FIG. 1 shows one embodiment of a block diagram of a network-based system 100 configured to provide status, progress, and/or length information on a scrollbar with a user device 120 over a network 160. As shown, system 100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

As shown in FIG. 1, the system 100 includes a user device 120 (e.g., a computer) and at least one server or device 180 (e.g., network server device) in communication over the network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) configured to communicate with other communication networks, such as the Internet.

The user device 120, in one embodiment, may be utilized by the user 102 to interact with the server 180 over the network 160. In various implementations, the user device 120 includes a wireless telephone (e.g., cellular or mobile phone), a tablet, a personal computer, a notebook computer, a wearable computing device, and/or various other generally known types of wired and/or wireless computing devices.

The user device 120 includes a software application 122 that includes a progress scrollbar tool 124. The progress scrollbar tool 124 may consist of one or more software applications, programs, modules, procedures, or other computer code to include firmware and may additionally include stored data that may be part of the software application 122 (not shown), where it modifies the presentation of the GUI to implement the progress scrollbar functionality described herein. In the embodiment shown in FIG. 1, the progress scrollbar tool 124 is part of the software application 122 and resides on server 180. In other embodiments, the software application 122 and/or the progress scrollbar tool 124 may reside on one or more servers, computers, or other hardware platforms of the system 100. The progress scrollbar tool 124 may consist of one or more initiation modules, mass command modules, and/or selection modules according to an embodiment.

In the embodiment of FIG. 1, the server 180 is connected to the user device 120 by the network 160. The software application 122 and the progress scrollbar tool 124 may be stored on the server 180 and are loaded, in whole or in part, to the user device 120 over the network 160 when the user 102 initiates or otherwise calls the software application 122. The software application 122 presents the GUI on the user device 120. In other embodiments, the software application 122 may be loaded on a single computer instead of the system 100 or the software application 122 and/or the progress scrollbar tool 124 may be stored in whole or in part on both the user device 120 and the server 180. The system 100 shown is only one possible implementation of the progress scrollbar tool 124 in conjunction with the software application 122.

Figure 2:
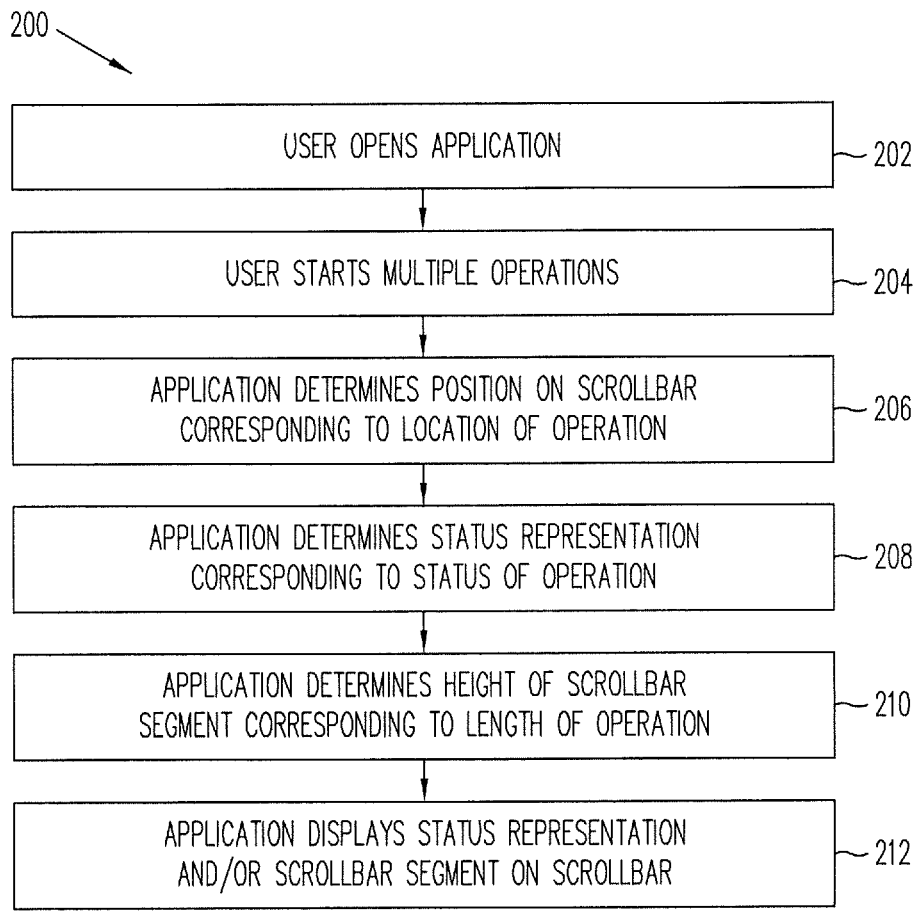
FIG. 2 is a flowchart showing a method for providing status, progress, and/or length information on a scrollbar according to an embodiment of the present disclosure.

Referring now to FIG. 2, a flowchart 200 of a method for providing status, progress, and/or length information on a scrollbar for multiple processes or operations is illustrated according to an embodiment of the present disclosure. At step 202, the user 102 opens a software application 122, which may be a program, a website, a web application, etc., and decides that he or she wants to perform multiple operations. For example, the user 102 may decide he or she wants to execute multiple queries or modify multiple files. The progress scrollbar may be implemented for any applications that perform a process or operation, particularly applications capable of concurrently performing multiple operations that take a period of time to complete. The operation may be, for example, an SQL query, a modification (e.g., updating or deleting a file), or a transfer (e.g., updating or downloading a file).

At step 204, the user 102 starts the multiple operations. The operations may be multiple types of operations, or multiple instances of an operation, or both. In an embodiment, the user 102 enters one or more operations in an application 122 and executes the operations. The user 102 continues to enter and execute additional operations, so that the application 122 is performing many operations. In another embodiment, the user 102 initiates one or more operations on multiple files or software applications. For example, the user 102 may modify multiple files or software applications, such as updating or deleting files. In another example, the user 102 may initiate uploading and/or downloading of files in a file transfer application. In a further example, the user 102 may scan or virus-check many files, directories, or applications.

At step 206, the application 122 determines a position on the scrollbar corresponding to a location of each operation. In an embodiment, the position represents the order of the operation in the sequence of the other operations. For example, the further down the scrollbar the position is, the earlier the operation was executed. The higher up the position is, the later the operation was executed. In one embodiment, the application 122 determines the length of the full content (e.g., text, picture, spreadsheet, list, etc.), determines where the operation is located relative to the full content, and determines the position relative to the full length of the scrollbar, wherein the position corresponds to the relative location of the operation.

In one embodiment, only the operations that are performed during a current session are represented on the scrollbar. The scrollbar resets each session, for example, every time the user 102 logs in to the application 122 or every time the user 102 shuts down the application 122. In other embodiments, the user 102 is able to set how far the user 102 wants the scrollbar to go back, including across sessions. The user 102 may set, by user settings/preferences, the scrollbar to represent operations that were performed within a predetermined period of time (e.g., a week), within a certain number of previous sessions, or within a certain number of operations. For example, a company may want to keep a certain amount of history on the application 122 but not want the history to become too long, so the company may decide to limit how far the scrollbar goes back, for example, a week or a month.

At step 208, the application 122 determines a status representation to be displayed on the scrollbar corresponding to the status of each operation. In an embodiment, the application 122 determines the status of each operation, such as "complete," "in progress," "cued," "error," etc., and determines the status representation corresponding to that status. Each type of status may be graphically represented by a different status representation having a distinctive icon, color, color scheme, shape, design, image, or any combination thereof.

At step 210, the application 122 determines a height of a segment corresponding to the length of the operation. In various embodiments, the segment, which may be a part of the scrollbar or a shape on the scrollbar, represents the length of the operation. The height of the segment is proportional to the length of the operation relative to the full content. In an embodiment, a user 102 performs multiple operations and/or multiple instances of an operation, and each operation has a different length. The application 122 determines the length of the full content of all operations, determines the proportional length of the operation relative to the full content, and determines the corresponding proportional height of the segment relative to the height of the scrollbar. Thus, an operation with few lines will have shorter segments, and an operation with many lines will have longer segments on the scrollbar.

At step 212, the application 122 displays the status representation and/or segment for each operation on the scrollbar. In an embodiment, the application 122 graphically provides the status and length information for each operation by displaying the status representation of each operation in the segment for that operation. Thus, the user 102 may view the status, length, and location information of the operations conveniently on the scrollbar, and can jump to an operation with a certain status by scrolling or clicking on the status representation of interest.

In some embodiments, the status representations and/or the segments further provide progress information. The scrollbar may provide progress information by dynamically updating and/or refreshing the status representation and/or the segment height. Progress of an operation is represented by movement in the status representation, such as a bar or line moving from left to right, a change in color, or both. If applicable, the segment height may increase or decrease as operation becomes longer or shorter relative to the full content. In a further embodiment, the status representation dynamically changes to a different type of status representation when the status of the operation changes. For example, an "in progress" status representation for an operation may change to a "completed" status representation once the operation is complete.

A specific example applicable to the flowchart 200 will now be described. In various embodiments, the user 102 opens a software application 122 (e.g., a program, website, web application, etc.) that performs SQL queries, SQL query statements, SQL events, etc., and decides that he or she wants to execute SQL queries. As used herein, "query" means a query statement, a query object, a query receipt, and/or a query history. As used herein, "query object" is a single query statement. As used herein, "query receipt" is a group of one or more query statements that the user 102 executes as a group, for example, by hitting the "execute" button. Each query receipt is represented on the scrollbar as one segment in the scrollbar and represents one or more query objects. As used herein, "query history" is a group of one or more query statements that the application 122 presents to the user 102, for example, to view by scrolling. The full length of the scrollbar represents the query history.

The user 102 then enters and executes SQL queries. In an embodiment, the user 102 loads or types in one or more query objects on an interface of the application 122. In many embodiments, the user 102 executes the one or more query objects, for example, by clicking the "Go" button, hitting an "execute" button, or pressing enter. Each time the user 102 executes one or more query objects by hitting the "execute" button, the application 122 creates a query receipt and groups the one or more query objects into one query receipt. The user 102 may then continue entering query objects and hit the "execute" button to execute the next group of query objects and create the next query receipt.

Next, the application 122 determines a position on the scrollbar corresponding to the location of a query receipt within a query history. The query receipt comprises one or more query objects executed together (e.g., by one "execute" button hit). As each segment on the scrollbar corresponds to the user 102 executing a query receipt, each execution of a query receipt adds a segment on the scrollbar.

Next, the application 122 determines the status representation to be displayed on the scrollbar corresponding to the status of the query receipt, which includes the status of each query object, and/or a height of a segment corresponding to the length of the query receipt. The application 122 then displays the status representation and/or the segment for each query receipt on the scrollbar. All query receipts that are in the query history are represented on the scrollbar. In some embodiments, the status representations and/or the segments of the query receipt further provide progress information.

Figure 3:
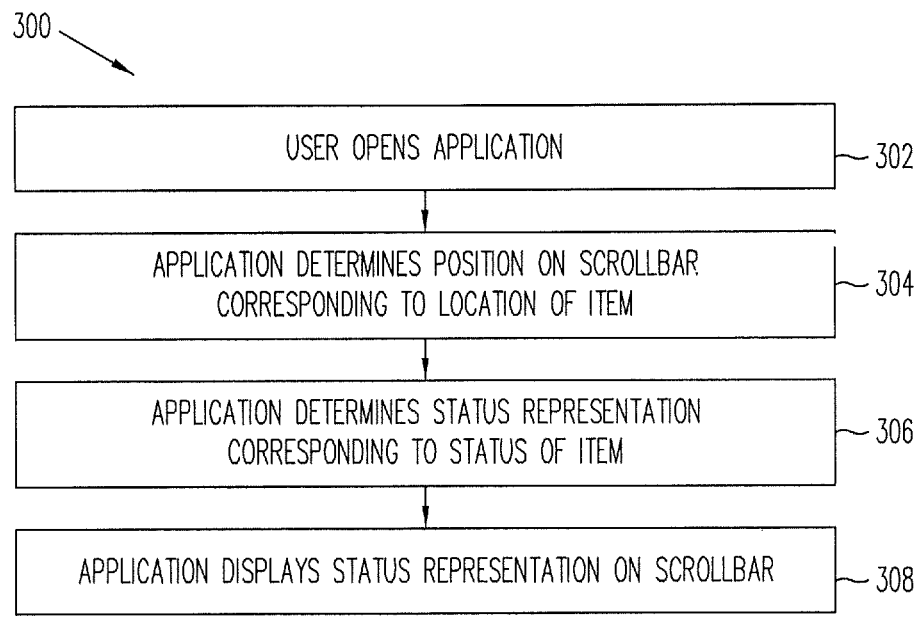
FIG. 3 is a flowchart showing a method for providing status information of items on a scrollbar according to an embodiment of the present disclosure.

Referring now to FIG. 3, a flowchart 300 of a method for providing status information of items is illustrated according to an embodiment of the present disclosure. At step 302, the user 102 opens a software application 122 (e.g., a program, website, web application, etc.) and decides that he or she wants to view multiple items, such as files, emails, messages, pictures, videos, goods, products, services, etc., that have an associated status. The items may be displayed in the application 122 as a list, spreadsheet, etc. The status scrollbar may be implemented for any software applications or programs with items that may have an associated status. For example, the user 102 may decide he or she wants to open an email application to view email messages, with each message having a status, for example, of "read," "unread," "urgent," "important," "response requested," etc.

If applicable, when the item does not have an inherent status, the user 102 may select one or more properties or attributes (e.g., file size, type, author, date created, date modified, etc.) that the user 102 is interested in, so that each item has an attributed "status" with respect to that property or attribute. For example, the user 102 may open an application that displays files and select file type. Each file will have a "status" with respect to file type such that the status is the file type for each file. Thus, the status representation will indicate the type of file for each file.

At step 304, the application 122 determines a position on the scrollbar corresponding to the location of each item. The positions represent each item on the scrollbar. In one embodiment, the application 122 determines where the item is located relative to all items, and determines the corresponding position relative to the full length of the scrollbar.

At step 306, the application 122 determines a status representation to be displayed on the scrollbar corresponding to the status, property, or attribute of an item. The status representation may be an icon, color scheme, shape, design, image, or a combination thereof.

At step 308, the application 122 displays the status representation of each item in the position for that item. In an embodiment, the status representation is in a box or a segment at the position. Thus, the user 102 may view the location and other information of items conveniently on the scrollbar, and can jump to an item with a certain status by scrolling or clicking on the scrollbar.

In some embodiments, if the items have an associated progress, the status representations and/or the segments further provide progress information. The scrollbar may provide progress information by updating and/or refreshing the status representation.

In an embodiment, the user 102 opens an application 122 for checking messages, such as emails. The application 122 determines the status of a message, which may be, for example, "read," "unread," "urgent," "important," "response requested," and displays the corresponding status representation. Thus, a user 102 can quickly jump or scroll to messages that have not been read, or important messages. In another embodiment, the user 102 opens an application 122 to view items at a merchant or library and runs a search for items. The application 122 determines the status of items, which may be, for example, "available," "checked out," "out of stock," etc., and displays the corresponding status representation. Thus, a user 102 can quickly jump to an available good or product at a merchant website or a book at a library.

In another embodiment, the user 102 opens an application 122 for checking the status of services. The application 122 determines the status of a service, which may be, for example, "completed," "in progress," "shipped," "canceled," and displays the corresponding status representation. Thus, a user 102 can quickly jump or scroll to a service that is in progress. In an embodiment, the application 122 updates the status representations so that the status representation provides progress information.

In a further embodiment, the user 102 selects a property or attribute, and the application 122 displays a representation corresponding to each file's attribute or property. For example, the user 102 selects "file type," and the application 122 displays the representation on the scrollbar for each file, so that the user 102 can see in one convenient place what type of files there are without the need to scroll, and quickly scroll or jump to a file type of interest.

FIGS. 4A and 4B are illustrative examples of status representations and segment heights that may be used to provide status, progress, and/or length information on a scrollbar according to an embodiment of the present disclosure, and may be used in methods 200 and/or 300.

FIG. 4A shows examples of status representations that use a color scheme 400 according to an embodiment of the present disclosure. As shown, the different colors are represented as different patterns. In an embodiment, the color or color scheme indicates the status of an operation or item. Green, for example, indicates that the operation went well and has completed. Red indicates that there was a problem with a part or all of the operation. Blue, for example, indicates that the operation is going well but not completed. Thus, in FIG. 4A, the "cued but not started" status 402 is represented by a blank or grey. The "in progress" status 404 is represented by blue on the left and blank or grey on the right, divided by a horizontal line. The "complete" status 406 is represented by green, which indicates that the operation has completed with no errors. The "lots of errors" 408 status is represented by red on the left and blank or grey on the right, divided by a horizontal line, which indicates that there was a problem with the operation. The operation with "lots of errors" 408 status may have been stopped based on user settings/preferences. For example, the user 102 may set the application 122 to stop an operation after a predetermined number of errors (e.g., 20 errors) such that when the number of errors exceeds the predetermined number of errors, the operation is stopped and an alert dialog is provided for user notification. The "complete with few errors" status 410 is represented by green with one or more red horizontal lines running through the green, which indicates that the operation completed successfully, but had one or more errors along the way. In the case of SQL queries, "complete with few errors" is an acceptable form of successful completion. In other embodiments, different colors, color combinations, color schemes, lines, shapes, icons, designs, images etc. may be used for the status representation.

In many embodiments, the color and/or horizontal line of the "in progress" status representation 404 provides progress information of an operation, such as a query receipt, and moves from the left to right. The line starts on the left side when the operation begins, and moves to the right in proportion to the progress. The line reaches the right side when complete. The progress information may be provided dynamically, such as by updating and/or refreshing in real-time. In one embodiment, one or more red horizontal lines of the "completed with few errors" status 410 represents when the one or more errors occurred. For example, each red horizontal line may represent one error. In another example, each red horizontal line may represent more than one error close together.

In certain embodiments, the status representations are customizable through user settings/preferences. For example, the user 102 may be able to set the color scheme used for the status representations. In another example, the user 102 may set a red horizontal line to represent up to a certain number of errors. The user 102 may want the red horizontal line to represent one or few errors when the error limits are small, and many errors when the error limits are larger.

FIG. 4B shows examples of segment heights that correspond to length of an operation, such as a script, statement, SQL query, etc., according to an embodiment of the present disclosure. In one embodiment, a segment height for an operation, such as a query receipt, is determined by a character count, including returns and/or breaks. In other embodiments, the height is represented by the number of query objects in a query receipt. A query receipt that is a long script is represented by a very tall segment 414, a query receipt that is one statement is represented by a short segment 416, a query receipt with several statements is represented by an intermediate segment 418, and a query receipt with lots of statements is represented by a tall segment 420.

Figure 5A:
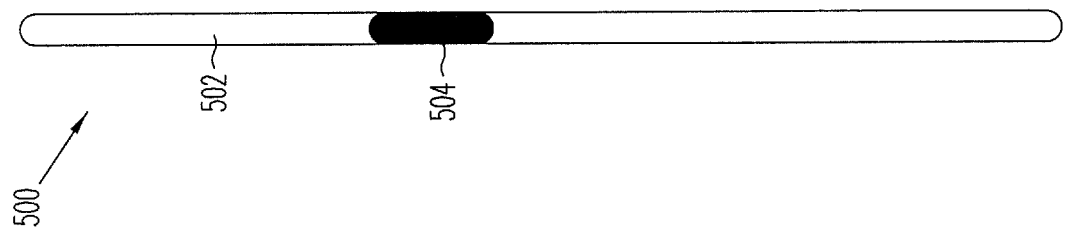
FIG. 5A is an example of a conventional scrollbar with a track and a bar.

FIGS. 5A-D are illustrative examples of scrollbars. FIG. 5A is an illustration of a conventional scrollbar 500 that comprises a track 502 and a bar 504. The conventional scrollbar 500 allows the user 102 to scroll through space for continuous text, pictures, spreadsheets, lists, etc., or scroll through time for audio or video content.

Figure 5B:
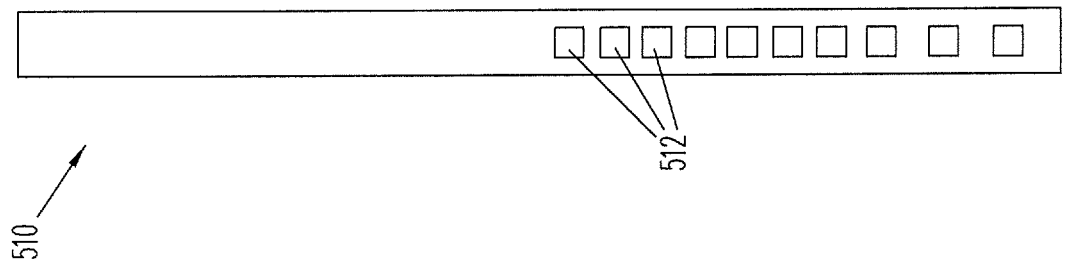
FIGS. 5B-D are illustrative examples of scrollbars providing status, progress, and/or length information according to various embodiments of the present disclosure.

FIG. 5B is an example of a scrollbar 510 providing status information according to an embodiment of the present disclosure. In an embodiment, the status information is provided by displaying each status representation in a box or a segment 512 on the scrollbar. In some embodiments, each box or segment 512 is equal in size.

Figure 5C:
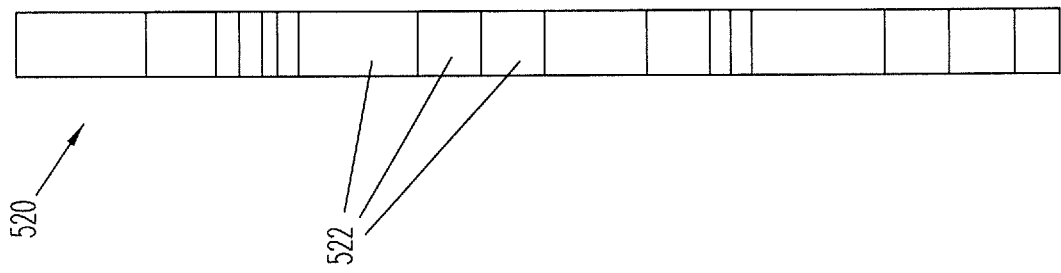

FIG. 5C is an example of a scrollbar 520 providing length information according to an embodiment of the present disclosure. In various embodiments, the full length of the scroll bar 520 represents the full length of a query history, and the proportion of the segment 522 in relation to the size of the scrollbar 520 corresponds to the length of each query receipt in proportion to the query history.

Figure 5D:
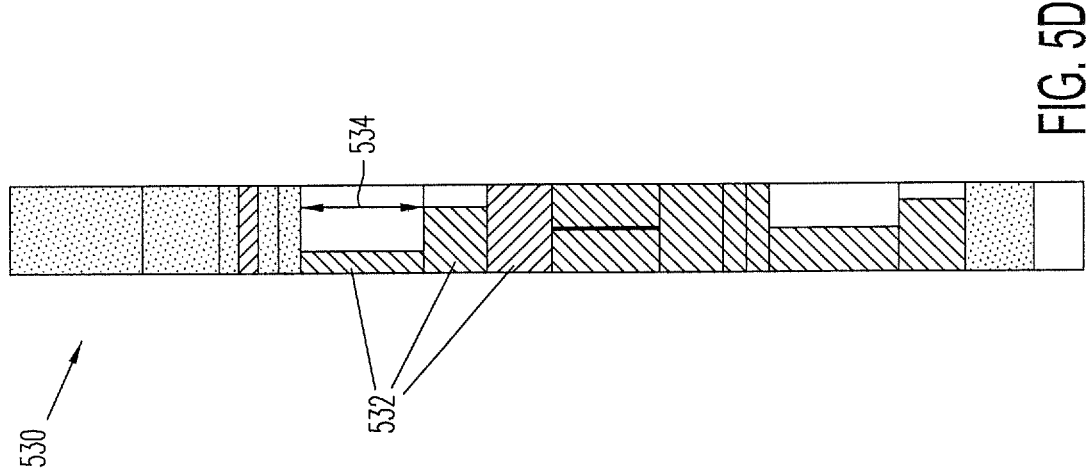

FIG. 5D is an example of a scrollbar 530 providing both status and length information according to an embodiment of the present disclosure. In an exemplary embodiment, the status representation of a query receipt, which provides status information, is displayed on the segment 532 for the same query receipt. The segments have a height 534 that is proportional to the length of each query receipt, and are in order of execution. Thus, the status, length, and location information are all provided on the scrollbar 530. In some embodiments, the scrollbar 530 includes progress information in the status representation.

Figure 5E:
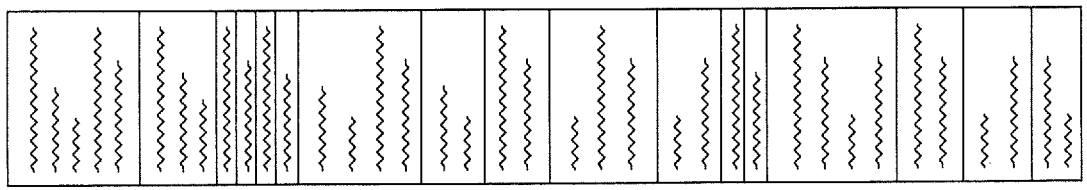
FIG. 5E is an example of a scrollbar providing a miniature representation of all content.

FIG. 5E is an example of a scrollbar 540 providing a miniature representation of the full content (e.g., text, picture, spreadsheet, list, etc.), such as a query history.

In an embodiment, the scrollbar can be widened or narrowed, and the form of scrollbar depends on the width of the scrollbar. The wider form of the scrollbar may display more information than the narrow form of the scrollbar. For example, when the scrollbar is in its narrowest form, it may provide a conventional scrollbar of FIG. 5A without additional information. When the user widens the scrollbar, it may provide only the status information by displaying the status representations as in FIG. 5B, only the length information by displaying the segments as in FIG. 5C. When the user further widens the scrollbar, it may provide both status and length information by displaying the status representations in the segments as in FIG. 5D. When the user again further widens the scrollbar, it may provide a miniature representation of the full content (e.g., text, picture, spreadsheet, list, etc.) as in FIG. 5E.

Referring now to FIG. 6, an exemplary screenshot 600 of a window or display illustrating a script area 602 of an application 122 with a scrollbar 604 providing status, progress, length, and location information according to an embodiment of the present disclosure. In an embodiment, the user 102 loads or types SQL queries in the script area 602. The user 102 may execute all entered query objects by clicking the "Execute All" button 606 to create a query receipt comprising one or more query objects, or execute one query object at a time by clicking the "Execute" button 608 to create a query receipt comprising only one query.

The user 102 may click on the "See All" button 610 to see the status representations of all query receipts in the query history on the segments of the scrollbar. The user 102 may click on one or more segments 612 on the scrollbar to select those segments to display status information of corresponding query receipts. The SQL queries are entered in order from top to bottom in the script, so the segment on the bottom of the scrollbar represents the very last query receipt that the user 102 executed. Further, the positions of the segments are in sequential order of when the user 102 hit the execute buttons. In an embodiment, a segment is dynamically added on the scrollbar each time the user 102 executes a query receipt by, for example, hitting the "execute" button in the interface. The previous segments are compressed accordingly to fit the newly added segment.

Figure 7:
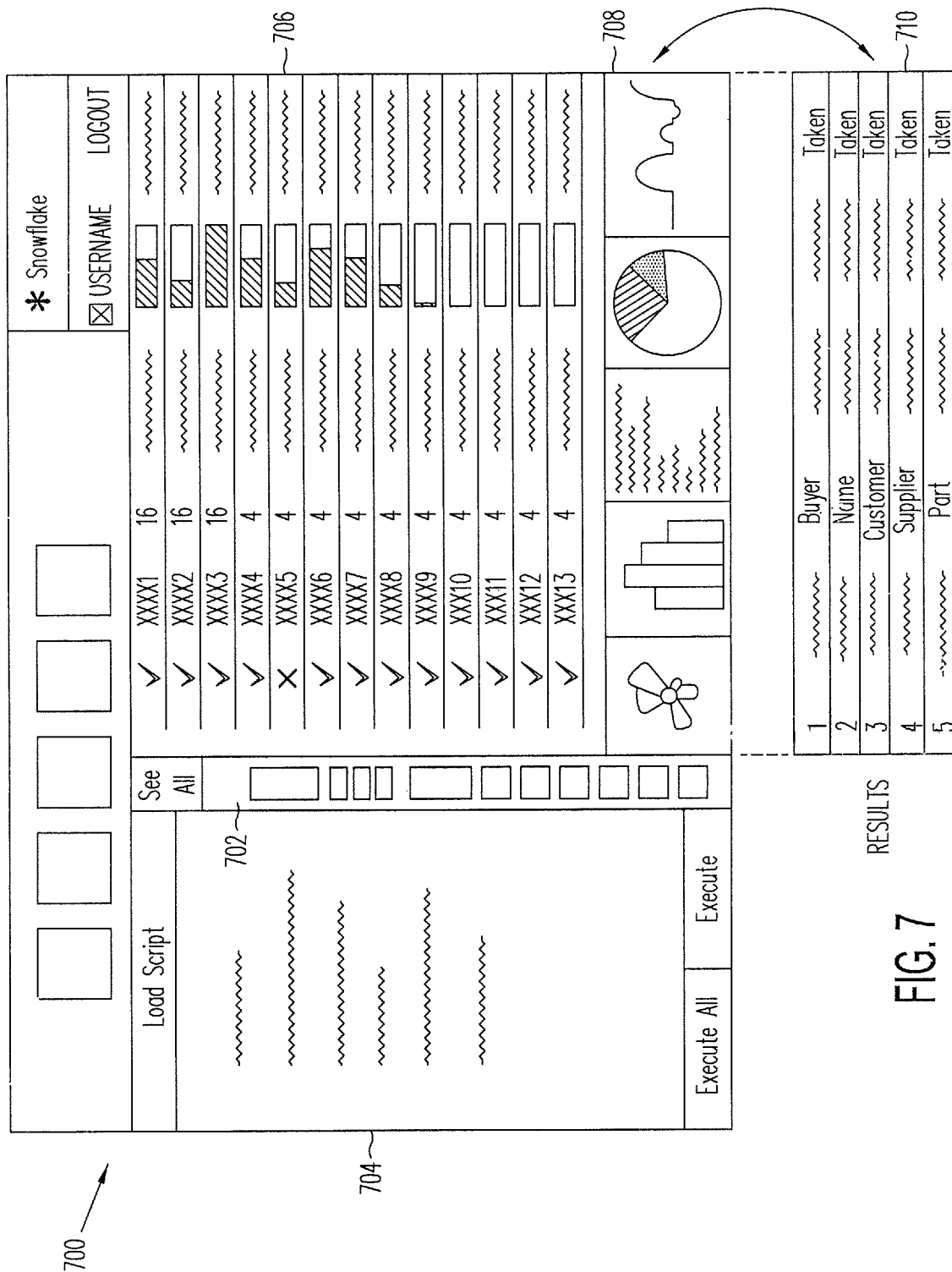
FIG. 7 is a screenshot that illustrates an application with a scrollbar providing status, progress, and/or length information according to an embodiment of the present disclosure.

Referring now to FIG. 7, illustrated is an exemplary screenshot 700 of a window or display illustrating an application 122 that performs SQL queries according to an embodiment of the present disclosure. In an embodiment, the application 122 includes a scrollbar 702, a script area 704, a status area 706, and a result areas 708, 710. The scrollbar 702 provides status, progress, length, and location information. The user 102 loads or types in SQL queries in the script area 704. The status area 706 displays the status of the SQL queries. The result area 708, 710 provides the results of the SQL queries, which may be displayed in graphical form 708 or in data form 710. In some embodiments, the user 102 may switch and/or toggle between the two forms of the result area 708, 710.

Figure 8:
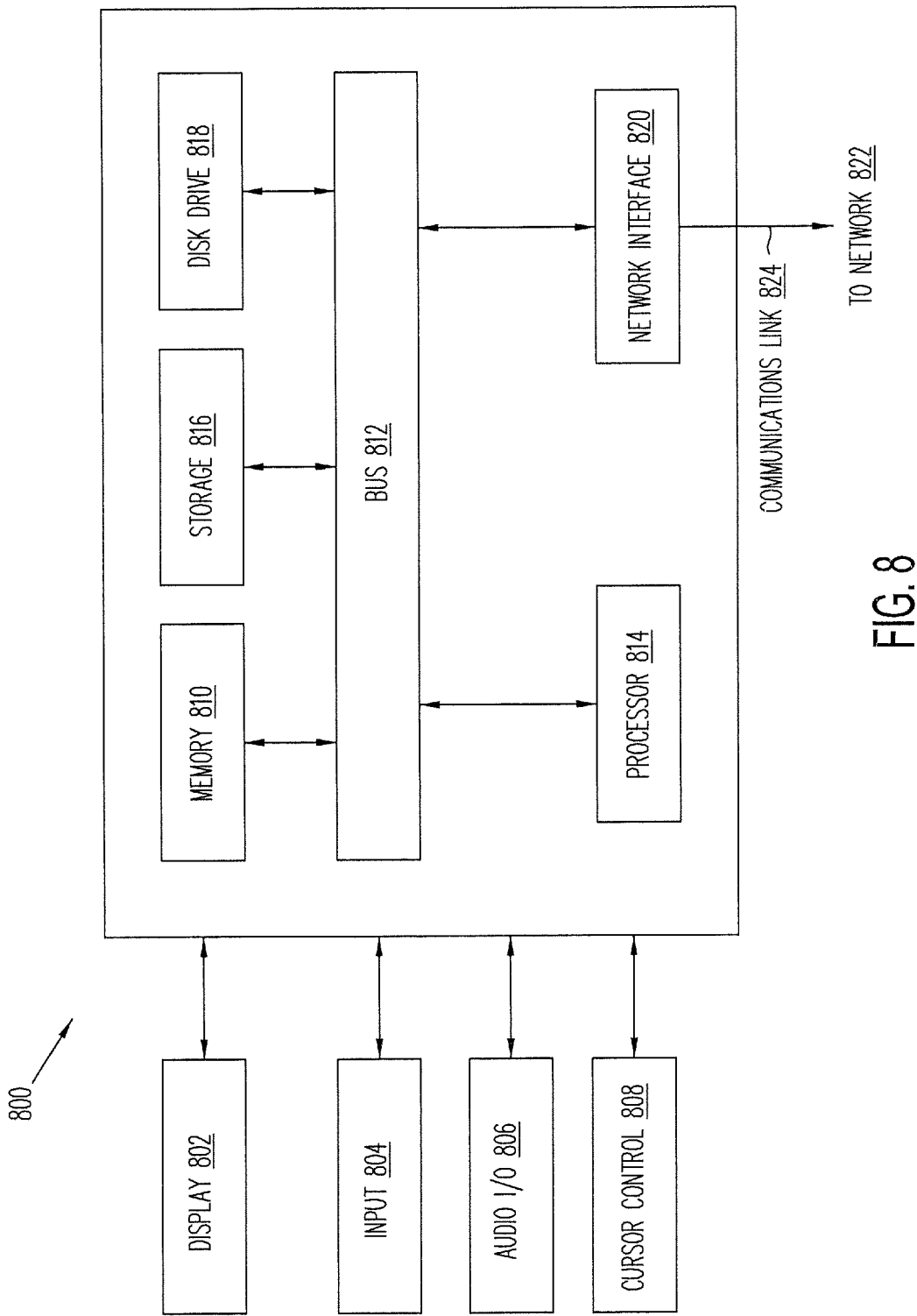
FIG. 8 is a block diagram of a system for implementing a device according to an embodiment of the present disclosure.

FIG. 8 is a block diagram of a computer system 800 suitable for implementing one or more embodiments of the present disclosure, including the user device 120 and the server 180. In various implementations, the user device 120 may comprise a mobile cellular phone, personal computer (PC), laptop, wearable computing device, etc. configured for wireless communication, and the server 180 may comprise a network computing device, such as a server. Thus, it should be appreciated that the devices 120 and 180 may be implemented as computer system 800 in a manner as follows.

Computer system 800 includes a bus 812 or other communication mechanism for communicating information data, signals, and information between various components of computer system 800. Components include an input/output (I/O) component 804 that processes a user action, such as selecting keys from a keypad/keyboard, selecting one or more buttons or links, etc., and sends a corresponding signal to bus 812. I/O component 804 may also include an output component, such as a display 802 and a cursor control 808 (such as a keyboard, keypad, mouse, etc.). An optional audio input/output component 806 may also be included to allow a user to use voice for inputting information by converting audio signals. Audio I/O component 806 may allow the user to hear audio. A transceiver or network interface 820 transmits and receives signals between computer system 800 and other devices, such as another user device via network 822. In one embodiment, the transmission is wireless, although other transmission mediums and methods may also be suitable. A processor 814, which can be a micro-controller, digital signal processor (DSP), or other processing component, processes these various signals, such as for display on computer system 800 or transmission to other devices via a communication link 824. Processor 814 may also control transmission of information, such as cookies or IP addresses, to other devices.

Components of computer system 800 also include a system memory component 810 (e.g., RAM), a static storage component 816 (e.g., ROM), and/or a disk drive 818. Computer system 800 performs specific operations by processor 814 and other components by executing one or more sequences of instructions contained in system memory component 810. Logic may be encoded in a computer readable medium, which may refer to any medium that participates in providing instructions to processor 814 for execution. Such a medium may take many forms, including but not limited to, non-volatile media, volatile media, and transmission media. In various implementations, non-volatile media includes optical or magnetic disks, volatile media includes dynamic memory, such as system memory component 810, and transmission media includes coaxial cables, copper wire, and fiber optics, including wires that comprise bus 812. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is configured to read.

In various embodiments of the present disclosure, execution of instruction sequences to practice the present disclosure may be performed by computer system 800. In various other embodiments of the present disclosure, a plurality of computer systems 800 coupled by communication link 824 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are configured to perform steps as described herein, as non-transitory machine-readable medium comprising a plurality of machine-readable instructions which, when executed by one or more processors, are configured to cause the one or more processors to perform a method comprising steps described herein, and methods performed by one or more devices, such as a hardware processor, user device, server, and other devices described herein.

What is claimed is:

1. A system, comprising:
a memory;
and one or more processors in communication with the memory and configured to:
present a first type of scrollbar in a graphical user interface (GUI) of an application, the first type of scrollbar having an adjustable first width and displaying a first type of information that relates to a first operation and a second operation in the application, the first operation comprising a first query receipt and the second operation comprising a second query receipt;
detect a first user interaction changing the adjustable first width to an adjustable second width; and
in response to detecting the first user interaction, present a second type of scrollbar, the second type of scrollbar having the adjustable second width and displaying a second type of information different from the first type of information that relates to the first operation and the second operation, the displaying the second type of information comprising:
determining a first position on the scrollbar corresponding to a first location of the first operation and a second position on the scrollbar corresponding to a second location of the second operation in the application;
determining first status information of the first operation corresponding to a status of the first operation, the first status information comprising a first segment of a first size;
determining second status information of the second operation corresponding to a second status of the second operation, the second status information comprising a second segment of a second size, the second size different than the first size, the first size and the second size being based at least in part on a first number of query objects included in the first query receipt and a second number of query objects included in the second query receipt; and
displaying the first status information within the first segment of the first size, indicating a first progress of executing the first query receipt on a database, at the first position on the scrollbar and the second status information within the second segment of the second size, indicating a second progress of executing the second query receipt on the database, at the second position on the scrollbar to present the second type of the scrollbar.

2. The system of claim 1, wherein the one or more processors are further configured to:
determine a particular position on the first type of scrollbar corresponding to a particular location of the first operation; and
display the first type of information at the particular position.

3. The system of claim 1, wherein the one or more processors are further configured to:
display progress information by dynamically updating or refreshing the first status information corresponding to the first operation.

4. The system of claim 3, wherein the progress information is displayed by a movement of a line or a bar on the first status information.

5. The system of claim 1, wherein the one or more processors are further configured to:
detect a second user interaction changing the adjustable second width to an adjustable third width; and
in response to detecting the second user interaction, display a third type of scrollbar, wherein the third type of scrollbar has the adjustable third width and displays a third type of information different from the first type of information and the second type of information that relates to the first operation.

6. The system of claim 5, wherein the third type of information comprises a smaller representation of content of the application.

7. The system of claim 1, wherein the first status information comprises one or more of: a distinctive icon, a color, a color scheme, a shape, a design, and an image, and the first status information further includes a label indicating that the first query receipt is completed, in progress, cued, stopped with errors, or completed with errors.

8. The system of claim 1, wherein the first query receipt comprises a first group of database query statements that are executed together, and the second query receipt comprises a second group of database query statements that are executed together.

9. The system of claim 1, wherein displaying the first status information, indicating a first progress of executing the first query receipt, at the first position on the scrollbar and the second status information, indicating a second progress of executing the second query receipt, at the second position on the scrollbar further comprises:
updating the first status information within the first segment of the first size to reflect the first progress during the executing of a first plurality of query statements from the first query receipt; and
updating the second status information within the second segment of the second size to reflect the second progress during the executing of a second plurality of query statements from the second query receipt.

10. The system of claim 1, wherein the first size and the second size are further based at least in part on a length of a script or database query, or a character count including returns and breaks.

11. The system of claim 1, wherein the first status information within the first segment of the first size and the second status information within the second segment of the second size are displayed substantially adjacent with the first segment of the first size being displayed above the second segment of the second size in a vertical arrangement.

12. A method, comprising:
presenting a first type of scrollbar having an adjustable first width, the first type of scrollbar displaying a first type of information of a first operation and a second operation of an application, the first operation comprising a first query receipt and the second operation comprising a second query receipt;

detecting a first user interaction changing the adjustable first width to an adjustable second width; and in response to the detecting, presenting a second type of scrollbar, the second type of scrollbar having the adjustable second width and displaying a second type of information different from the first type of the information that relates to the first operation and the second operation, the displaying the second type of information comprising:

determining a first position on the scrollbar corresponding to a first location of the first operation and a second position on the scrollbar corresponding to a second location of the second operation in the application;

determining first status information of the first operation corresponding to a status of the first operation, the first status information comprising a first segment of a first size;

determining second status information of the second operation corresponding to a second status of the second operation, the second status information comprising a second segment of a second size, the second size different than the first size, the first size and the second size being based at least in part on a first number of query objects included in the first query receipt and a second number of query objects included in the second query receipt; and displaying the first status information within the first segment of the first size, indicating a first progress of executing the first query receipt on a database, at the first position on the scrollbar and the second status information within the second segment of the second size, indicating a second progress of executing the second query receipt on the database, at the second position on the scrollbar to present the second type of the scrollbar.

13. The method of claim 12, further comprising updating the first status information of the first segment to provide progress information of the first operation.

14. The method of claim 13, wherein the progress information is provided by a movement of a line or a bar on the first status information.

15. The method of claim 12, further comprising:
detecting a second user interaction changing the adjustable second width to an adjustable third width; and
in response to detecting the second user interaction, displaying a third type of scrollbar, wherein the third type of scrollbar has the adjustable third width and displays a smaller representation of content of the application.

16. A non-transitory machine-readable medium comprising instructions which, in response to a computer system, cause the computer system to perform a method comprising:
presenting a first type of scrollbar in a graphical user interface (GUI), the first type of scrollbar having an adjustable first width, the first type of scrollbar displaying a first type of information of a first operation and a second operation of an application, the first operation comprising a first query receipt and the second operation comprising a second query receipt;

detecting a first user interaction changing the adjustable first width to an adjustable second width;

in response to the detecting, presenting a second type of scrollbar, the second type of scrollbar having the adjustable second width and displaying a second type of information different from the first type of the information that relates to the first operation and the second operation of the application, the displaying the second type of information comprising:

determining a first position on the scrollbar corresponding to a first location of the first operation and a second position on the scrollbar corresponding to a second location of the second operation in the application;

determining first status information of the first operation corresponding to a status of the first operation, the first status information comprising a first segment of a first size;

determining second status information of the second operation corresponding to a second status of the second operation, the second status information comprising a second segment of a second size, the second size different than the first size, the first size and the second size being based at least in part on a first number of query objects included in the first query receipt and a second number of query objects included in the second query receipt; and displaying the first status information within the first segment of the first size, indicating a first progress of executing the first query receipt on a database, at the first position on the scrollbar and the second status information within the second segment of the second size, indicating a second progress of executing the second query receipt on the database, at the second position on the scrollbar to present the second type of the scrollbar.

17. The non-transitory machine-readable medium of claim 16, wherein the first status information includes a label of complete, in progress, cued, or error.

18. The non-transitory machine-readable medium of claim 16, wherein the method further comprises:
updating the first status information, and wherein the first status information provides progress information.

19. The non-transitory machine-readable medium of claim 16, wherein the method further comprises:
detecting a second user interaction changing the adjustable second width to an adjustable third width;
in response to detecting the second user interaction, presenting a third type of scrollbar, wherein the third type of scrollbar has the adjustable third width and displays the first status information and length information of the first operation;
detecting a third user interaction changing the adjustable third width to an adjustable fourth width; and
in response to detecting the third user interaction, presenting a fourth type of scrollbar, wherein the fourth type of scrollbar has the adjustable fourth width and displays a smaller representation of content of the application.

* * * * *